(12) United States Patent
Kim

(10) Patent No.: US 7,300,087 B2
(45) Date of Patent: Nov. 27, 2007

(54) OPENING/CLOSING STRUCTURE FOR A TRAY OF AN AUTOMOBILE

(75) Inventor: Young-seok Kim, Seongnam-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 662 days.

(21) Appl. No.: 10/810,826

(22) Filed: Mar. 29, 2004

(65) Prior Publication Data

US 2005/0133553 A1 Jun. 23, 2005

(30) Foreign Application Priority Data

Dec. 18, 2003 (KR) .................. 10-2003-0092952

(51) Int. Cl.
*B60R 7/00* (2006.01)
(52) U.S. Cl. .................................... 296/37.1
(58) Field of Classification Search .............. 296/37.1, 296/24.3, 37.8, 37.9, 37.12
See application file for complete search history.

(56) References Cited

U.S. PATENT DOCUMENTS

| 5,397,160 | A * | 3/1995 | Landry ..................... 296/37.8 |
| 5,520,313 | A * | 5/1996 | Toshihide .................. 224/539 |
| 5,893,478 | A * | 4/1999 | Maruoka ................... 220/827 |
| 6,027,155 | A * | 2/2000 | Wisniewski et al. ....... 296/37.1 |
| 6,854,778 | B2 * | 2/2005 | Lee ........................ 296/37.12 |
| 7,044,529 | B2 * | 5/2006 | Svenson et al. ........... 296/37.8 |
| 2005/0205591 | A1 * | 9/2005 | Kogami .................... 220/830 |
| 2006/0066120 | A1 * | 3/2006 | Svenson et al. ......... 296/37.12 |
| 2007/0018474 | A1 * | 1/2007 | Jeon ........................ 296/37.8 |

FOREIGN PATENT DOCUMENTS

| JP | 62210150 | 9/1987 |
| JP | 2000-247186 | 9/2000 |

OTHER PUBLICATIONS

English Language Abstract of JP 62-210150.
English Language Abstract of JP 2000-247186.

* cited by examiner

*Primary Examiner*—H Gutman
(74) *Attorney, Agent, or Firm*—Greenblum & Bernstein, P.L.C.

(57) ABSTRACT

A main body of a tray is provided with, at its lower part, a button, and a fixing hook part moved up and down by the button to adjust an opening/closing a door formed on the front surface of the main body. Eventually, since a user's hand will not come into contact with the door though the button when it is operated by separating the button from the door, the opening/closing structure of the present invention is capable of eliminating an inconvenient feeling due to use of the tray and improve reliability of the items in the tray. The main body of the tray for storing these items and having a through-hole at its lower end is provided with the door. The door is opened by rotating upward by a rotary means at the front surface of the tray. The door is provided with a hooking hole formed at the position corresponding to the through-hole of the main body. A button part is installed at a lower end of the main body. In an inner part of the button part, the fixing hook part to be inserted or released into/from the hooking hole through the through-hole according to the operation of the button is installed.

3 Claims, 3 Drawing Sheets

OPENING/CLOSING STRUCTURE FOR A TRAY OF AN AUTOMOBILE

RELATED APPLICATION

The present disclosure relates to subject matter contained in Korean application No. 2003-92952, filed on Dec. 18, 2003, which is herein expressly incorporated by reference its entirety.

BACKGROUND OF THE INVENTION

1. Field of the Invention

The present invention relates to an opening/closing structure for a tray of an automobile, and more specifically to an opening/closing structure for a tray of an automobile provided with a button installed on the lower part of the main body of a tray, and a fixing hook for adjusting an opening/closing of the door installed on a front portion of the main body by moving the button up and down so that the door and the button are separated from each other and not in contact with a user's hand, even when using the button, thereby being more convenient due to use of the tray and improving the reliability of the tray product.

2. Description of the Related Art

Generally, an instrument panel of an automobile is provided with a facia board in front of the driver's seat and a glove box in front of the seat next to the driver.

In addition, formed between the driver's seat and the seat next to the driver is a center facia provided with various switches for operating an audio system and an air ventilating system etc.

Further, the center facia is provided with a tray for cigarette ashes or small items such as coins or cards. The tray can be mounted on various positions other than the center facia.

FIG. 1 is a view for illustrating a prior art tray for opening a door upward. As shown in FIG. 1, a button 13 is installed at a door 12 formed at a front surface of a main body 16 of a tray 11.

In addition, the button 13 is engagedly operated with the hook 14, which is hooked or released at/from a hooking plate 15 formed at the main body 16 of the tray 11.

Therefore, when a user pushes the button 13 with an inlet of the tray 11 closed as shown in FIG. 1, the hook 14 is moved and the hooking plate 15 is released, and the door 12 is rotated upward by a rotary device (not shown) to open the inlet of the tray 11 as shown in a right side of FIG. 1.

On the other hand, FIG. 2 is a view for illustrating a prior art tray for opening a door downward. As shown in FIG. 2, a handle 23 is installed at a door 22 formed at a front surface of a main body 26 of a tray 21.

In addition, a lower end of the door 22 is hinge engaged with the main body 26 of the tray 21, and a protrusion 24 protruded at a rear surface of the door 22 is hooked or released at/from the main body 26 of the tray 21.

Therefore, when a user presses the door 22 downward by using the handle 23 with an inlet of the tray 21 closed as shown in a left side of FIG. 2, the protrusion 24 is separated from the main body 26 of the tray 21 and rotated to open the inlet of the tray 21 as shown in a right side of FIG. 2.

However, in the opening/closing structure of the trays, since the user directly presses the door or the handle, the user's hand comes into contact with the door on the opening the door to result in inconvenience.

SUMMARY OF THE INVENTION

It is an object of the present invention to provide an opening/closing structure for a tray of an automobile capable of preventing a user's hand from coming into contact with the door, although the door is open, when a button installed at a position other than on the door is operated, by changing the mounting position of the button which has been installed at the door for opening/closing an inlet of the tray.

In accordance with the present invention, there is provided an opening/closing structure for a tray of an automobile comprising a main body for storing various kinds of small items and having a through-hole at its lower end; a door for opening/closing by rotating upward a front surface of the main body by using a rotary means, and provided with a hooking hole conforming with a position of the through-hole; a button part installed at the lower end of the main body; and a fixing hook part installed at an inner part of the button part, and inserted or released in/from the hooking hole through the through-hole depending upon a snap operation of the button part.

The opening/closing structure for a tray of an automobile is provided with a button installed at a lower part of the main body of the tray to eliminate any inconvenience due to the opening of the tray since the user's hand does not come to contact with the door though the button is operated when the door is opened/closed.

BRIEF DESCRIPTION OF DRAWINGS

Other objects and aspects of the present invention will become apparent from the following description of embodiments with reference to the accompanying drawings in which.

DESCRIPTION OF THE PREFERRED EMBODIMENT

Hereinafter, a preferred embodiment of the present invention will be described in conjunction with the accompanying drawings.

Figure 1:
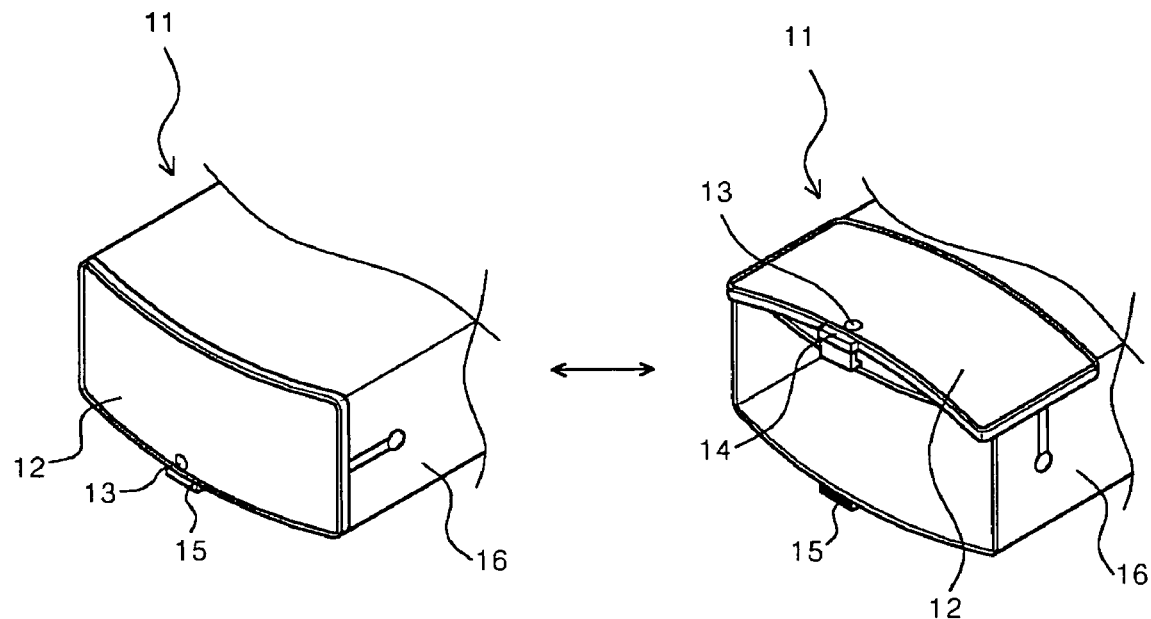
FIG. 1 is a view for illustrating a prior art tray for opening a door upward.
Figure 2:
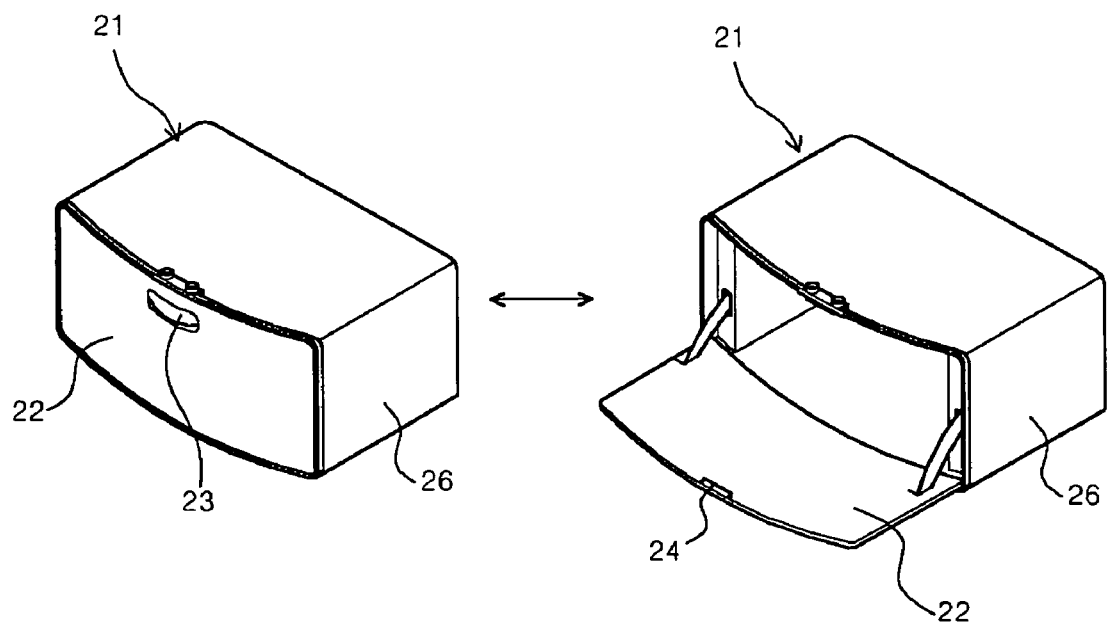
FIG. 2 is a view for illustrating another prior art tray for opening a door downward.
Figure 3:
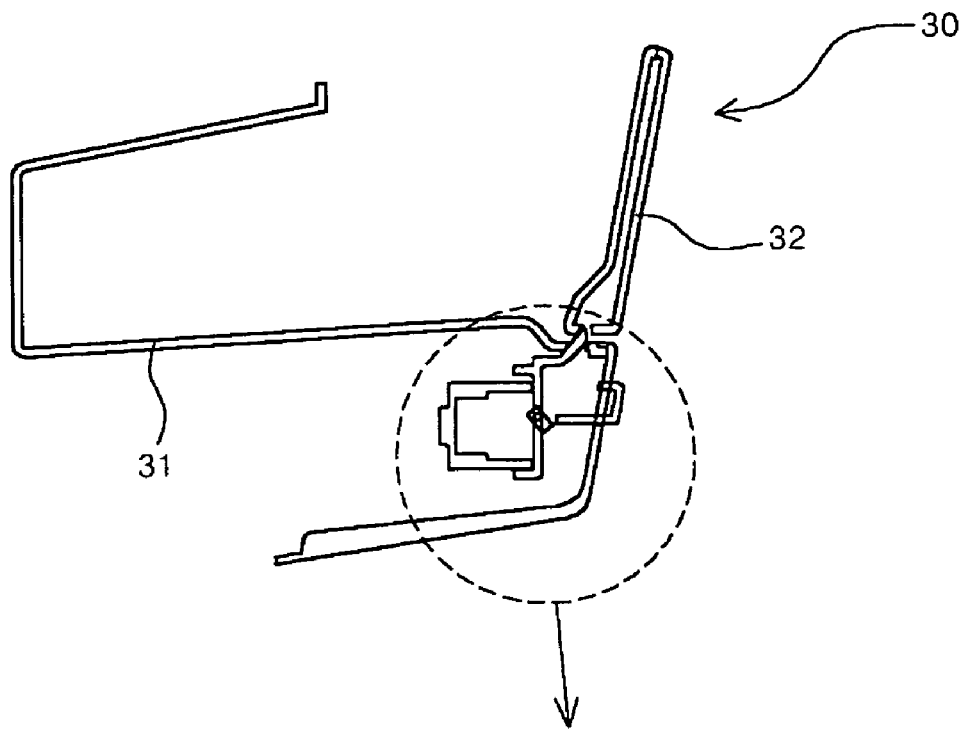
FIG. 3 is a cross-sectional side view for illustrating a closed state of a door of a tray in accordance with the present invention.
Figure 3:
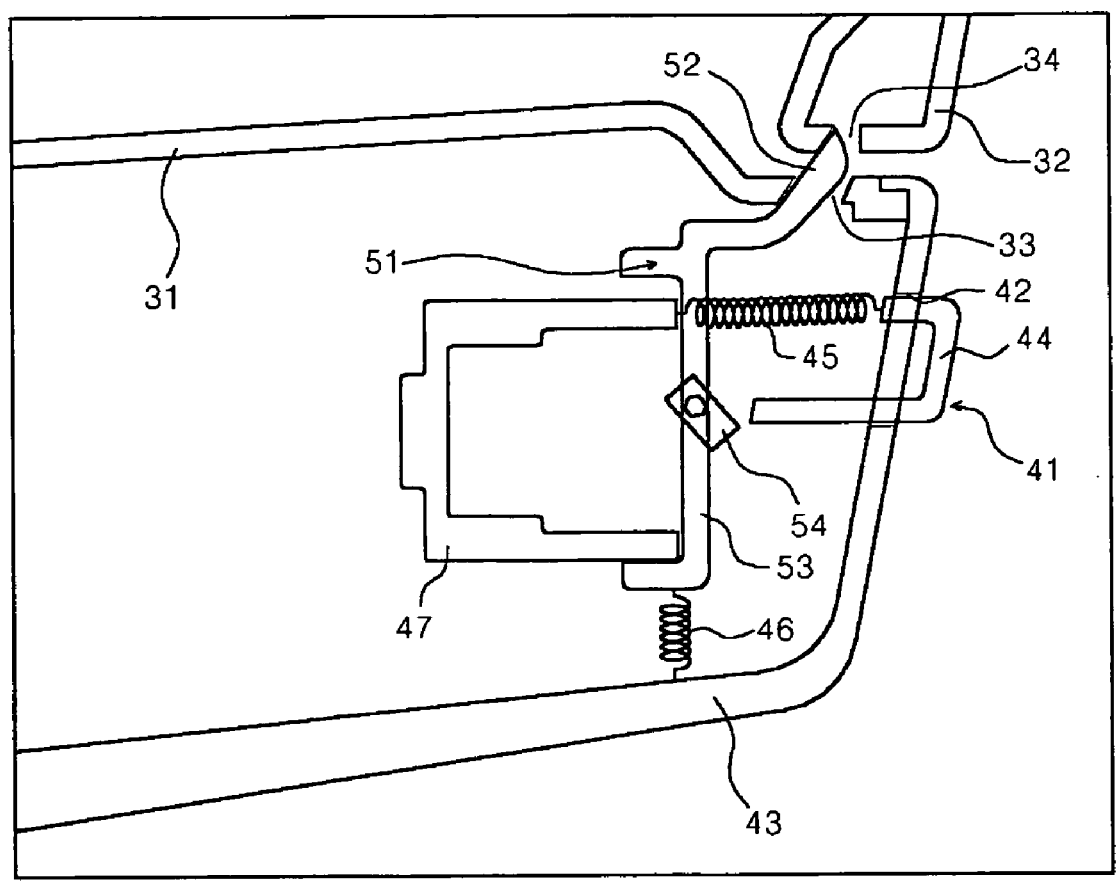
Figure 4:
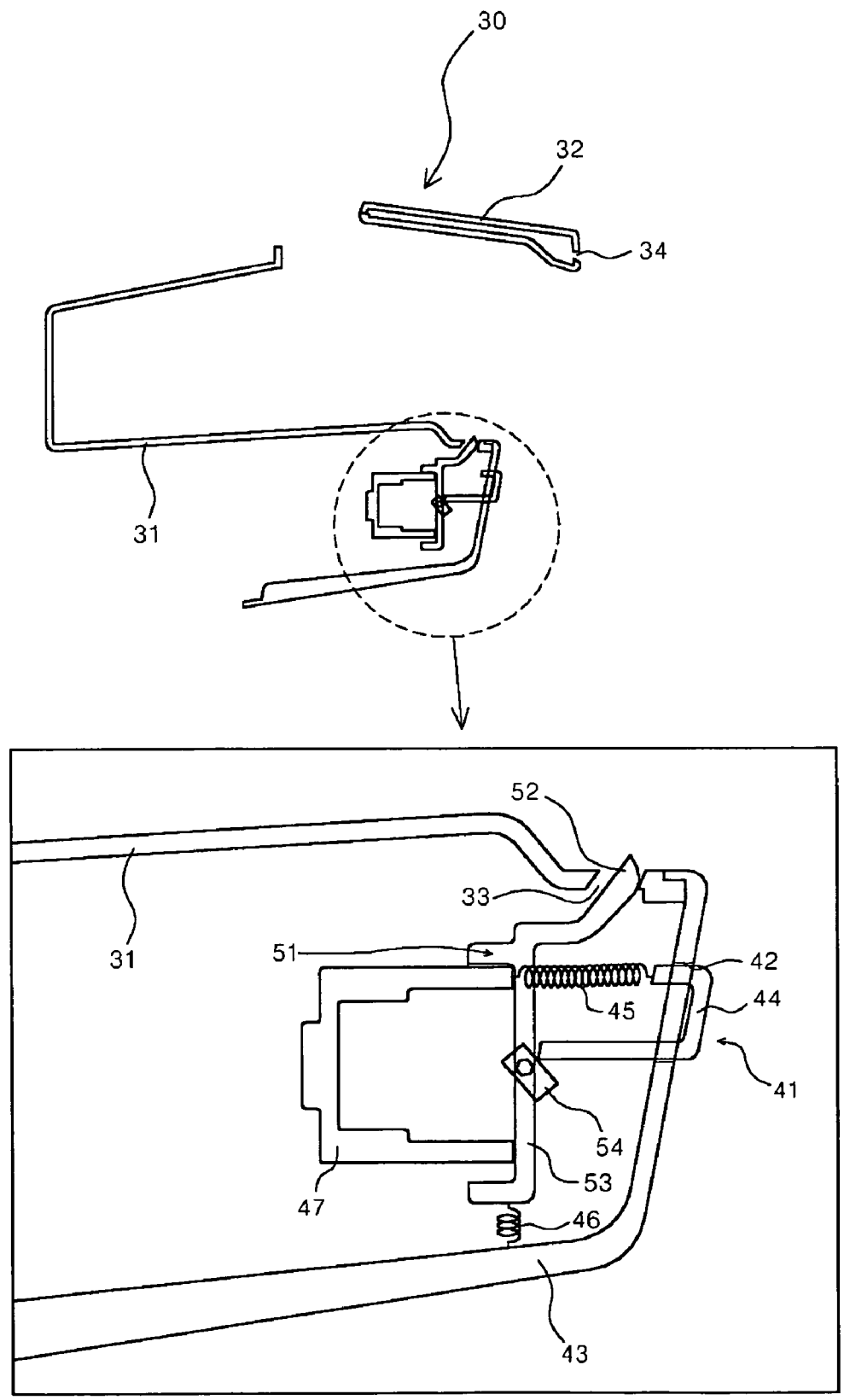
FIG. 4 is a cross-sectional side view for illustrating an opened state of the door of the tray in accordance with the present invention.

FIG. 3 is a cross-sectional side view for illustrating a closed state of a door of a tray in accordance with the present invention; and FIG. 4 is a cross-sectional side view for illustrating an opened state of the door of the tray in accordance with the present invention.

As shown in FIGS. 3 and 4, a tray 30 for storing various types of small items in an automobile is provided with a main body 31 forming an inner space for storing the items, a door 32 for opening/closing a front inlet of the main body 31, a button part 41 installed at a lower side of the main body 31 to carry out the opening/closing operation of the door 32, and a fixing hook part 51.

First, the main body 31 may be located anywhere a suitable space is occupied, as a place requiring a depositing space except a center facia or a console box. The main body 31 is provided with an opened front surface and a through-hole 33 at its lower end.

In addition, the door 32 for opening/closing the opened front surface of the main body 31 has a structure rotated by a rotary means (not shown), but provided with a hooking hole 34 conforming to a through-hole 33 at its lower end when the door 32 is closed.

At this time, the rotary means for rotating the door upward preferably comprises a leaf spring having a force to rotate the door upward when an external force is not applied.

On the other hand, the main body 31 is provided with the button part 41 at its lower end, in which the fixing hook part 51, for passing through the through-hole 33 to be inserted or released to/from the hooking hole 34 depending upon operation of the button 44, is installed.

That is, the button part 41 is sufficient to be located at a position, not interfering with the door 32, not causing the door to come into contact with a user's hand when the button is operated. And, the button part 41 is provided with a fixing plate 43 located at the lower part of the main body 31 and having a button hole 42.

Further, a button 44 is partially inserted into the button hole 42 and provided with a button spring 45, at its rear surface, having a recovering force against the button pressed when the button 44 is operated.

In addition, fixing hook part 51, of which one end is inserted into the hooking hole 34 through the through-hole 33, and moved downward by a compression of the button 44 with spaced apart from the rear surface of the button 44, is formed.

At this time, a distance between the fixing hook part 51 and the button 44 is sufficient to adjust a clearance of the button and prevent a malfunction due to excessive contact with the button 44 from generating.

Further, a fixing spring 46, is mounted on the lower end of the fixing hook part 51 to provide a recovering force when the fixing hook part 51 is moved downward, of which the other end is preferably fixed to an inner surface of the fixing plate 43.

Preferably, a supporting plate 47 for maintaining the fixing hook part 51 and the button 44 in place is provided in the fixing plate 43 in order to prevent the fixing hook part 51 from moving up and down and prevent a position shift of the button due to its lateral movement from generating.

When the supporting plate 47 is provided, the button spring 45 is preferably provided with one end fixed to the supporting plate 47 and the other end fixed to the rear surface of the button 44.

On the other hand, the fixing hook part 51 is provided with a protrusion 52 inserted into the hooking hole 34 through the through-hole 33, and the protruding plate 53 downwardly extended from the protrusion 52 to be spaced apart from the rear surface of the button and having a fixing sparing 46 at its lower end.

At this time, the protruding plate 53 is provided with an inclined plate 54 forming an inclined surface, which moves the fixing hook part 51 downward when the button 44 pushes the fixing hook part 51.

Hereinafter, an operation and effect of the present invention as described hereinabove will be described as follows.

FIG. 3 illustrates the state that the door closing the main body 31 of the tray since the door 32 is not rotated by inserting the protrusion 52 of the fixing hook part 51 into the hooking hole 34 through the through-hole 33.

In this state, when the user pushes the button 44, the rear surface of the button 44 pushes the inclined plate 54 to move the protruding plate 53 engaged with the inclined plate 54 downward to thereby separate the protrusion 52 of the fixing hook part 51 from the hooking hole 34, since the inclined plate 54 is slanted.

Therefore, the door 32, being not interfered with any other external force, is automatically rotated upward by the force of the rotary means to open the front surface of the main body 31, as shown in FIG. 4.

On the other hand, when the user eliminates a force pressed to the button 44, the button 44 of the button part 41 and the fixing hook part 51 is moved to the position as shown in FIG. 3 by the recovery force of the button 44 and the button spring 45.

Therefore, when the user intends to close the front surface of the main body 31 after the use of the tray 30 is completed, the user's hand to rotate the door 32 downward.

Then, the protrusion 52 of the fixing hook part 51 is instantly moved downward by the spring, and inserted into the hooking hole 34 of the door 32 to fix the door closed.

The opening/closing structure for a tray of an automobile in accordance with the present invention is provided with a button at a position not interfering with the door when opening/closing the tray to eliminate an inconvenience when opening/closing the tray and improve reliability of the tray articles, since the user's hand does not come into contact with the door though the button for opening/closing the tray when it is operated.

While this invention has been described in connection with what is presently considered to be the most practical and preferred embodiment, it is to be understood that the invention is not limited to the disclosed embodiment, but on the contrary, it is intended to cover various modification within the spirit and the scope of the appended claims.

What is claimed is:

1. An opening and closing structure for a tray of an automobile comprising:
 a main body for storage having a through-hole at its lower end;
 a door that opens and closes by rotating upward a front surface of the main body, and provided with a hooking hole conforming to a position of the through-hole;
 a button part installed at the lower end of the main body; and
 a fixing hook part installed at an inner part of the button part, and inserted in and released from the hooking hole through the through-hole depending on a snap operation of the button part.

2. The opening and closing structure according to claim 1, wherein the button part comprises:
 a fixing plate mounted on a lower end of the main body and having a button hole formed at its front surface;
 a button partially inserted into the button hole; and
 a button spring mounted on a rear surface of the button and having a recovery force when the button is operated.

3. The opening and closing structure according to claim 2, wherein the fixing hook part, installed in the fixing plate, comprises:
 a protrusion inserted into the hooking hole through the through-hole;
 a protruding plate extended from the protrusion and spaced apart from the rear surface of the button;
 a fixing spring mounted on a lower end of the protruding plate; and
 an inclined plate installed at the protruding plate and having an inclined surface that moves the fixing hook downward when the button is pressed.

* * * * *